(12) United States Patent
May et al.

(10) Patent No.: US 8,001,203 B2
(45) Date of Patent: *Aug. 16, 2011

(54) SCHEDULABLE E-MAIL FILTERS

(75) Inventors: Darrell Reginald May, Waterloo (CA); Michael Thomas Hardy, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/818,335

(22) Filed: Jun. 18, 2010

(65) Prior Publication Data

US 2010/0257249 A1 Oct. 7, 2010

Related U.S. Application Data

(63) Continuation of application No. 11/673,077, filed on Feb. 9, 2007, now Pat. No. 7,761,523.

(51) Int. Cl.
*G06F 15/16* (2006.01)

(52) U.S. Cl. ........ 709/206; 709/203; 709/204; 709/205; 709/207; 709/214; 709/220; 709/224; 709/223; 709/216; 709/219; 455/418; 455/419; 455/420

(58) Field of Classification Search .................. 709/203, 709/206, 207, 217–224

See application file for complete search history.

(56) References Cited

U.S. PATENT DOCUMENTS

| 6,230,156 | B1 | 5/2001 | Hussey |
| 6,714,967 | B1 | 3/2004 | Horvitz |
| 7,761,523 | B2 * | 7/2010 | May et al. ............. 709/206 |
| 2002/0144136 | A1 | 10/2002 | Stornetta et al. |
| 2004/0154022 | A1 | 8/2004 | Boss et al. |
| 2008/0195707 | A1 * | 8/2008 | May et al. ............. 709/206 |

FOREIGN PATENT DOCUMENTS

| EP | 1284570 A2 | 2/2003 |
| EP | 1326189 A3 | 8/2005 |

OTHER PUBLICATIONS

Extended European Search Report issued on Jul. 3, 2007 in connection with EP 07102038.2.
Slipstick Systems, Server-based vs. Client based Rules, Jul. 30, 2006 http://www.slipstick.com/rules/serverbased.htm.

* cited by examiner

*Primary Examiner* — Jude J Jean Gilles
(74) *Attorney, Agent, or Firm* — Ridout & Maybee LLP (57) ABSTRACT

An e-mail filter may be associated with a schedule defining a recurrent active time period. As such, some e-mail filters may be active at specific times of day and on specific days of the week and inactive the rest of the time. Before applying any filters, the current time is determined and it is determined which filters are active. The determination of which filters are active is based on the current time being within the active time period.

17 Claims, 6 Drawing Sheets

SCHEDULABLE E-MAIL FILTERS

CROSS-REFERENCE TO RELATED APPLICATIONS

The present application is a continuation of U.S. application Ser. No. 11/673,077, filed Feb. 9, 2007, the contents of which are hereby incorporated herein by reference.

FIELD

The present application relates generally to filtering of e-mail messages such that when a condition is met a corresponding action is carried out and, more specifically, to associating a recurring schedule with an e-mail filter.

BACKGROUND

The vast quantity of e-mail messages that traverse electronic communication networks daily has led some users to implement filters for their e-mail messages. E-mail filters act to sort and organize e-mail messages based on various conditions. The filters may control the carrying out of actions on outgoing e-mail messages, but more typically control the carrying out of actions on incoming e-mail messages. E-mail filters may be characterized by one or more conditions and one or more corresponding actions.

A first example application of incoming e-mail filtering involves inspecting the "From" field of each incoming e-mail message arriving in a general e-mail Inbox folder and, if the "From" field of a given e-mail message indicates a specified address of a particular sender, moving the given e-mail message into a folder specific to the particular sender. That is, the condition is the presence of the specified address in the "From" field and the action is moving the given e-mail message. A second example application of e-mail filtering involves inspecting an attachment, if any, of each incoming e-mail message arriving in a general e-mail Inbox folder and, if it is recognized that the attachment of a given e-mail message includes a previously defined computer virus, removing the attachment from the given e-mail message. That is, the conditions are the presence of an attachment and the presence of a virus in the attachment and the action is the removal of the attachment. A third example application of e-mail filtering involves inspecting each incoming e-mail message arriving in a general e-mail Inbox folder in an attempt to recognize tell-tale signs that the given e-mail message is spam, i.e., an unwanted commercial e-mail message, and, if the given e-mail message is recognized as spam, moving the given e-mail message into a "Deleted Items" folder. That is, the condition is that the given e-mail message is spam and the action the deletion of the given e-mail message.

Increasingly, mobile communication devices are available and are used to receive and to send e-mail messages over wireless network connections. Mobile device servers generally facilitate the access at the mobile device to e-mail services, which services are generally provided by enterprise servers. Since the price for access to wireless networks is sometimes charged to the user according to amount of data received over a particular wireless network and some mobile device servers forward to the mobile device each e-mail message received at the e-mail server, some users are interested in optimizing the use of the particular wireless network for e-mail services. Such optimization may take the form of configuring the mobile device server with a filter so that, for instance, the mobile device server filters the e-mail messages that have arrived at an enterprise server so as to only automatically forward selected e-mail messages to the mobile device over the wireless network. The action of forwarding an e-mail message received at an enterprise server to the mobile device may be based on a condition such as the presence, in the "To" field, of the e-mail address of the user of the mobile device.

In another example, the optimization of the use of the particular wireless network for e-mail services may take the form of configuring the mobile device server with a filter so that the selected e-mail messages that are automatically forwarded (action) to the mobile device over the wireless network are e-mail messages addressed to the "work" e-mail address of the user of the mobile device (condition). In a sense, the filtering in this case acts to suppress automatic forwarding to the mobile device of e-mail messages addressed to the "personal" e-mail address of the user of the mobile device.

While the suppression of automatic forwarding of personal e-mail messages to the mobile device may suit the user during the week, the user may, on weekends, prefer to reverse the filtering and, thereby, suppress delivery of work-related e-mail messages while allowing delivery of personal e-mail messages. Heretofore, such reversal of filtering, or any other change in the configuration of the filters, has been accomplished, inconveniently, through manual re-configuration of the e-mail filters.

BRIEF DESCRIPTION OF THE DRAWINGS

Reference will now be made to the drawings, which show by way of example, embodiments of the invention, and in which.

DETAILED DESCRIPTION OF THE EMBODIMENTS

As proposed herein, the use of specific e-mail filters, related, say, to automated forwarding of messages to a mobile communication device, may be associated with a recurrent schedule. As such, some e-mail filters may be active at specific times of day and on specific days of the week and inactive at other times.

According to an embodiment, there is provided a method of handling an e-mail message. The method includes receiving an e-mail message, determining a current time and selecting a candidate e-mail filter, the candidate e-mail filter defining a condition and an action to be carried out on e-mail messages that meet the condition, the candidate e-mail filter associated with a schedule defining a recurring active time period, the selecting based on the current time occurring within the recurring active time period. The method further includes determining whether the e-mail message meets the condition and, if the e-mail message meets the condition, carrying out the action. Additionally, an apparatus comprising a processor adapted to carry out this method is also provided, along with a computer readable medium for adapting the processor the carry out the method.

Other aspects and features of the present application will become apparent to those of ordinary skill in the art upon review of the following description of specific embodiments in conjunction with the accompanying figures.

Figure 1:
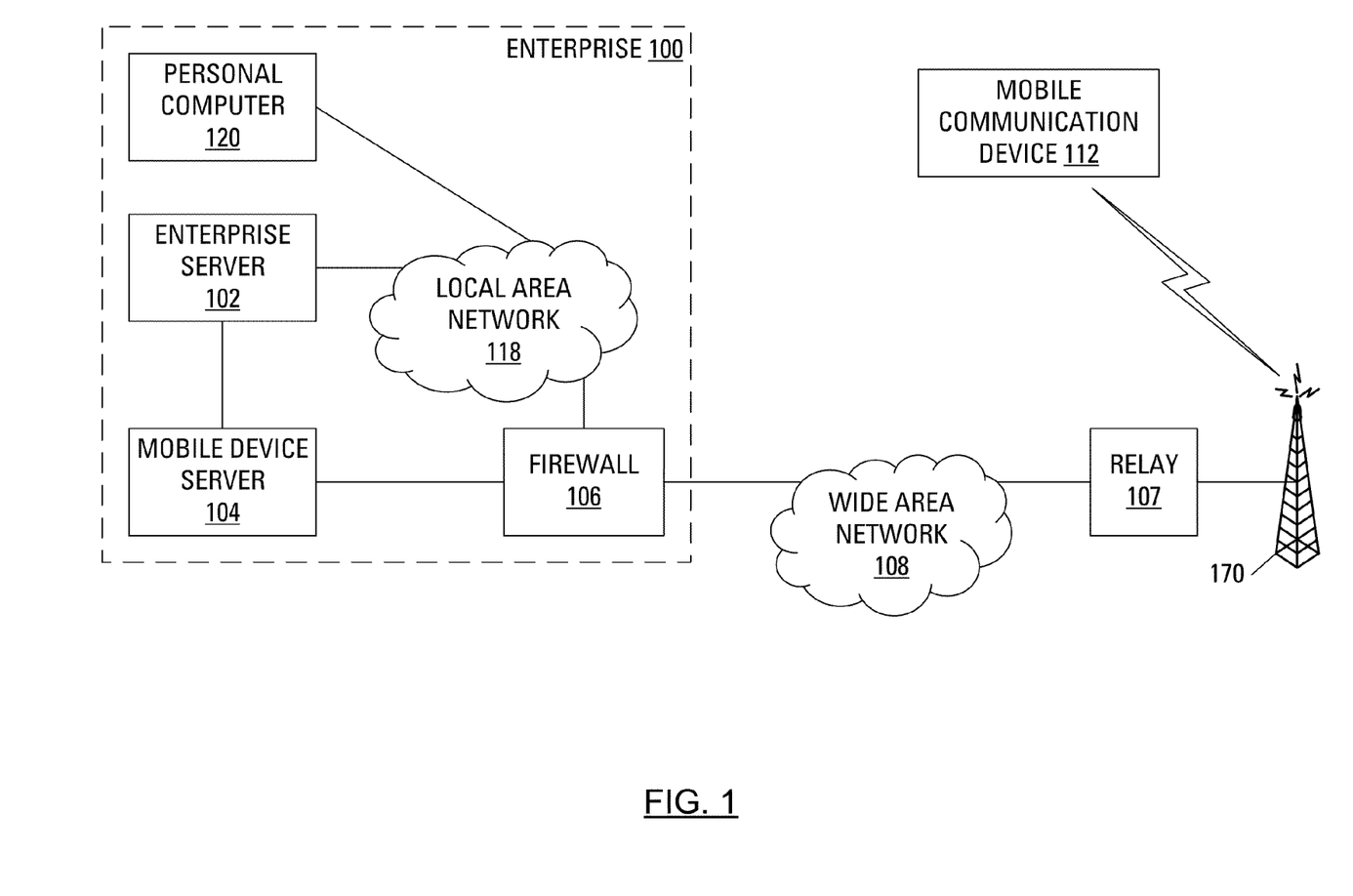
FIG. 1 illustrates a communication network including an enterprise with a wireless connection to a mobile data communication device.

As illustrated in FIG. 1, an enterprise 100 includes a local area network (LAN) 118 with an exemplary network node (a suitably configured personal computer 120) connected to a central enterprise server 102 via the LAN 118. The enterprise server 102, which may, for instance, be a Microsoft™ Exchange Server providing e-mail services, calendar services and contact management services, is connected to a wide area network (WAN, such as the public Internet, or a successor network) 108 via a firewall or proxy server 106. A wireless carrier network 170 operated by a wireless carrier also connects to the WAN 108, as does a relay 107. The wireless carrier network 170 is illustrated as connected to the WAN 108 via a connection to the relay 107. Mobile communications devices, such as an exemplary mobile communications device 112, may be connected to the wireless carrier network 170.

The enterprise 100 may take advantage of centralized management services for wireless communications by installing a mobile device server 104 with a connection via the firewall 106 to the WAN 108.

Figure 2:
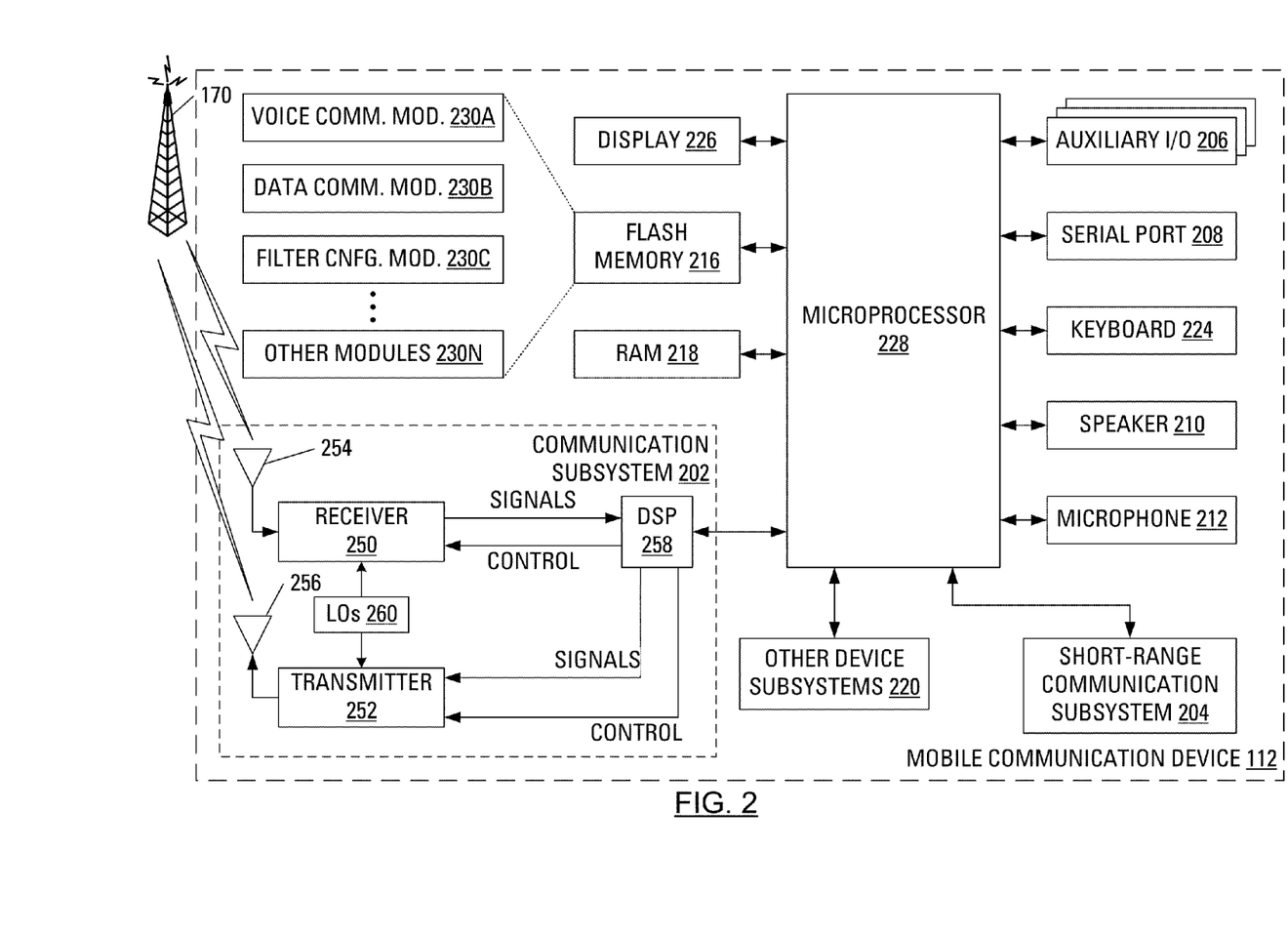
FIG. 2 schematically illustrates the mobile data communication device according to an embodiment.

FIG. 2 illustrates the handheld mobile communication device 112 including a housing, an input device (a keyboard 224) and an output device (a display 226), which is preferably a full graphic, or full color, Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile device 112, in part, responsive to actuation of keys on the keyboard 224 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the mobile device 112 are shown schematically in FIG. 2. These include: a communications subsystem 202; a short-range communications subsystem 204; the keyboard 224 and the display 226, along with other input/output devices including a set of auxiliary I/O devices 206, a serial port 208, a speaker 210 and a microphone 212; as well as memory devices including a flash memory 216 and a Random Access Memory (RAM) 218; and various other device subsystems 220. The mobile device 112 is preferably a two-way radio frequency (RF) communication device having voice and data communication capabilities. In addition, the mobile device 112 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile device 112. A predetermined set of software applications that control basic device operations, such as a voice communications module 230A and a data communications module 230B, may be installed on the mobile device 112 during manufacture. A filter configuration module 230C may also be installed on the mobile device 112 during manufacture, to implement aspects of the present application. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments and task items. The PIM application is also preferably capable of sending and receiving data items via the wireless carrier network 170. Preferably, the data items managed by the PIM application are seamlessly integrated, synchronized and updated via the wireless carrier network 170 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile device 112 is intended to operate. For example, the communication subsystem 202 of the mobile device 112 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 112.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile device 112 may send and receive communication signals over the wireless carrier network 170. Signals received from the wireless carrier network 170 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 170 are processed (e.g., modulated and encoded) by the DSP 258 and are then provided to the transmitter 252 for digital to analog conversion, frequency up conversion, filtering, amplification and transmission to the wireless carrier network 170 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, or some other type of input device. The composed data items may then be transmitted over the wireless carrier network 170 via the communication subsystem 202.

In a voice communication mode, overall operation of the device is substantially similar to the data communication mode, except that received signals are output to a speaker 210, and signals for transmission are generated by a microphone 212. Alternative voice or audio I/O subsystems, such as a voice message recording subsystem, may also be implemented on the device 112. In addition, the display 226 may also be utilized in voice communication mode, for example, to display the identity of a calling party, the duration of a voice call, or other voice call related information.

The short-range communications subsystem 204 enables communication between the mobile device 112 and other proximate systems or devices, which need not necessarily be similar devices. For example, the short-range communications subsystem may include an infrared device and associated circuits and components, or a Bluetooth™ communication module to provide for communication with similarly-enabled systems and devices.

In FIG. 1, the mobile device 112 may become associated with the enterprise 100 through a direct connection (not shown) between the mobile device 112 and the personal computer (PC) 120 of the enterprise 100 while an association process is executed at the PC 120.

The result of the association process may be the uploading of a device identifier of the mobile device 112 to the PC 120 and the downloading of a Unique Identifier (UID) of the mobile device server 104 from the PC 120 to the mobile device 112. The device identifier may be considered a characteristic of the mobile device 112 (e.g., a device identifier may be burned into the mobile device 112). The UID of the mobile device server 104 normally does not change.

The mobile device server 104 provides the UID for the mobile device server 104 and the current address of the mobile device server 104 to the relay 107.

The mobile device server 104, in conjunction with the relay 107, may provide centralized management of wireless communications, as follows. After the mobile device 112 registers (in conventional fashion) with the wireless carrier network 110 with which the relay 107 has an established communications path, the mobile device 112 sends a registration packet with its device identifier and the UID of the mobile device server 104 with which the mobile device 112 is associated. This registration packet is received by the wireless carrier network 110 and directed to the relay 107 with an identity of the wireless carrier network 110. On receiving this registration packet, the relay 107 associates the wireless carrier network 110 with the device identifier and returns a packet to the mobile device 112 with its own address. Any subsequent packets sent by the mobile device 112 are addressed to the relay 107. These subsequent packets include an indication of the UID. Utilizing the UID, the relay 107 looks up the address of the mobile device server 104 and forwards the packet to the mobile device server 104 associated with the UID, via the WAN 108.

Note that the term "packet" is used herein for an addressed unit of data that may also be called a "message", a "frame" or, more generically, a "protocol data unit".

Under typical circumstances, an e-mail message may arrive at the enterprise 100 via the WAN 108. The combination of the firewall 106 and the LAN 118 allow the e-mail message to appropriately arrive, more specifically, at the enterprise server 102. Through the use of an e-mail client software application, the user of the PC 120 may open and review the received e-mail message. Additionally, the mobile device server 104 may periodically poll the enterprise server 102 to determine whether e-mail messages have been received for the user of the mobile device 112. Alternatively, the enterprise server 102 may be arranged to send an indication to the mobile device server 104 whenever e-mail messages have been received for the user of the mobile device 112.

Upon determining that an e-mail message has been received for the user of the mobile device 112, the mobile device server 104 obtains the e-mail message from the enterprise server 102 and forwards the obtained e-mail message to the mobile device 112 via the firewall 106, the WAN 108, the relay 107 and the wireless carrier network 170.

The user of the mobile device 112 may subsequently configure an e-mail filter at the mobile device server 104. Traditionally, an e-mail filter as described above would be configured at the enterprise server 102 or at the PC 120, as part of the mail client, to handle actions such as moving a received e-mail message to a specified folder, removing an attachment or deleting a received e-mail message. When an e-mail filter is configured at the mobile device server 104, the action may simply be related to whether or not to forward the received e-mail message to the mobile device 112.

The configuration of the e-mail filter at the mobile device server 104 may be accomplished through use of a user interface presented, for example, on the PC 120 or on the mobile device 112. The user may configure the e-mail filter with a single condition or multiple conditions.

If e-mail filtering is configured, the mobile device server 104, upon obtaining a given e-mail message from the enterprise server 102, considers the given e-mail message in the context of the configured filtering conditions stored in the file associated with the account of the user of the mobile device

112. The mobile device server 104 forwards the given e-mail message to the mobile device 112 only if the mobile device server 104 determines that:

the e-mail message meets the configured filtering conditions; and the action associated with meeting the configured filtering conditions is "Forward the e-mail message to the mobile device 112".

In overview, an e-mail filter may be associated with a schedule defining a recurrent active time period. As such, some e-mail filters may be active at specific times of day and on specific days of the week and inactive the rest of the time. Before applying any filters, the current time is determined and it is determined which filters are active. The determination of which filters are active is based on the current time being within the active time period.

Figure 3:
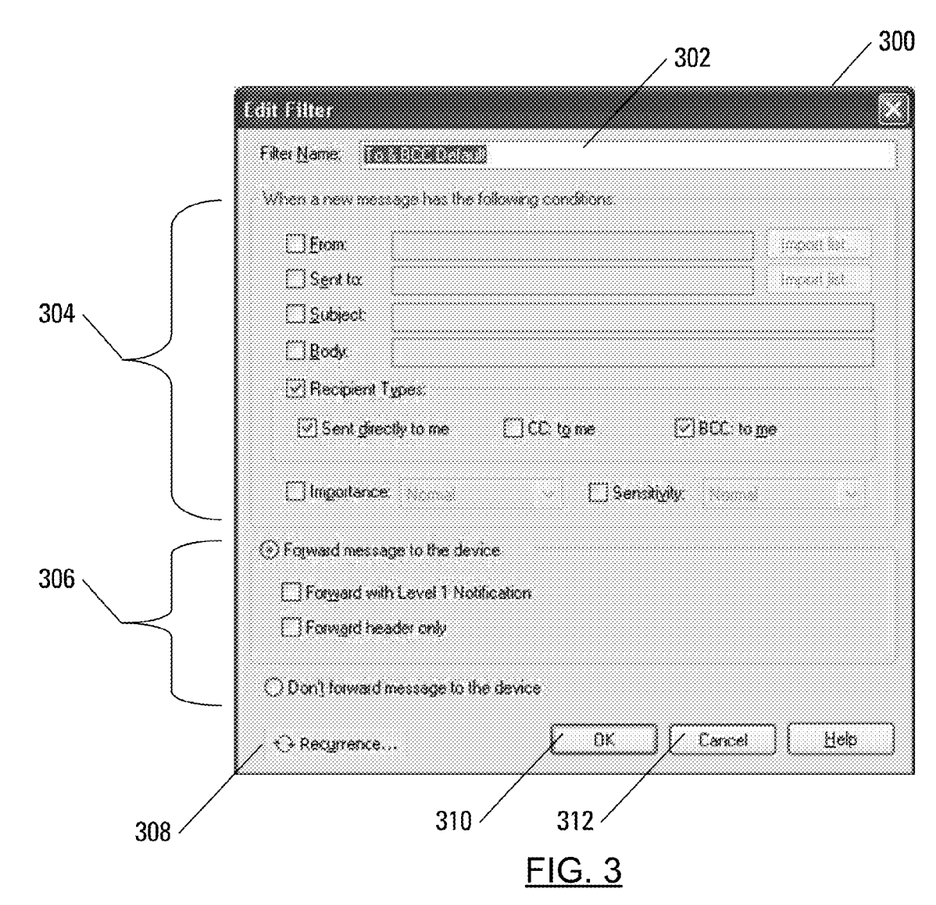
FIG. 3 illustrates an exemplary filter configuration user interface window for configuring an e-mail filter according to an embodiment.

An exemplary filter configuration user interface window 300 for configuring an e-mail filter is illustrated in FIG. 3 as may be shown on a display associated with the PC 120. Notably, the filter configuration user interface window 300 has a field 302 for a filter name, an area 304 for defining conditions and an area 306 for defining actions. In the conditions area 304 are several checkboxes; one checkbox each for specifying conditions related to the address of the sender ("From"), the address of a recipient ("Sent to"), the contents of the subject line ("Subject"), the contents of the body of the e-mail message ("Body") and the manner in which the recipient has been specified ("Recipient type"). Additional checkboxes in the conditions area 304 allow the specification of a particular importance level or sensitivity as filter conditions. Two radio buttons are provided in the actions area 306 allowing for a selection between "Forward message to the device" or "Don't forward message to the device".

Figure 4:
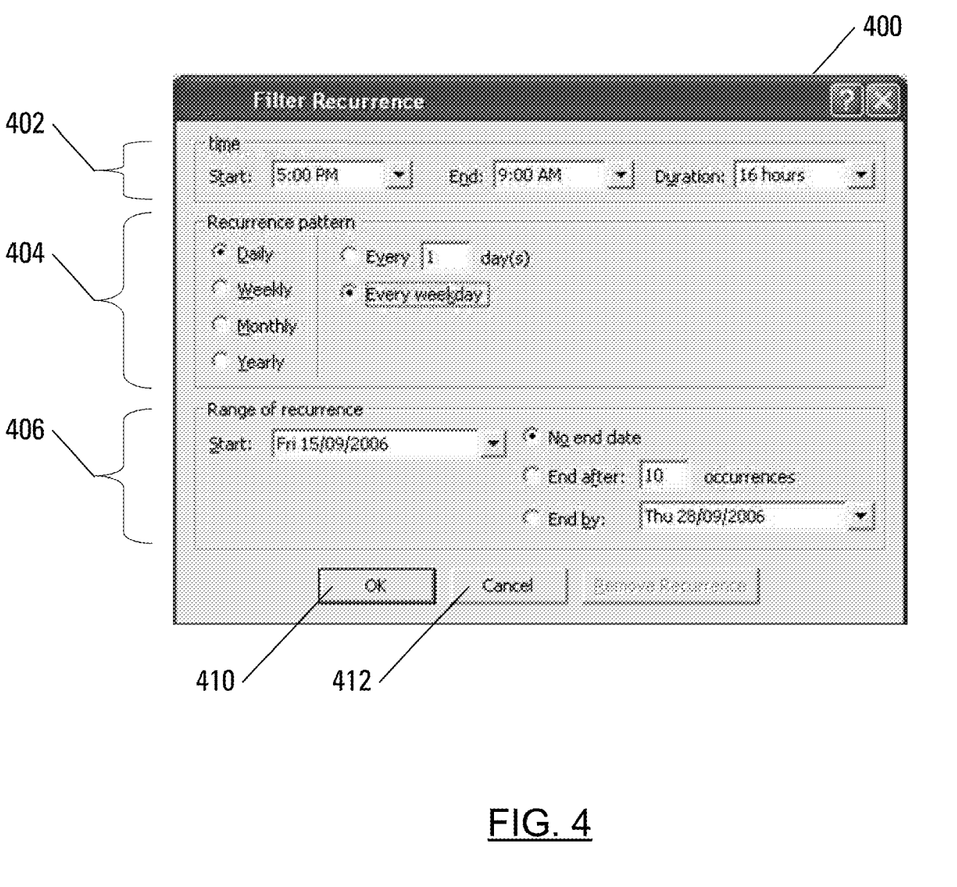
FIG. 4 illustrates a scheduling window related to the exemplary filter configuration user interface window of FIG. 3.

Additionally, the exemplary filter configuration user interface window 300 includes a "Recurrence" button 308. Actuation of the "Recurrence" button 308 causes the user interface application executing on the PC 120 to open and present a scheduling window 400, as illustrated in FIG. 4.

The scheduling window 400 has a time area 402 in which the user may select a start time from a start time drop down menu and an end time from an end time drop down menu to define the active time period of the filter defined in the exemplary filter configuration user interface window 300 of FIG. 3. Responsive to the selections, a duration drop down menu self-adjusts to reflect the duration of the active time period as defined by the start time and the end time. Alternatively, the user may make a selection using only one of the start time drop down menu and the end time drop down menu and select a duration from the duration drop down menu, responsive to which the non-selected one of the start time drop down menu and the end time drop down menu will self-adjust.

The scheduling window 400 also has a pattern area 404 in which the user may define a recurrence pattern for the active time period defined in the time area 402. The active time period may, for example, be defined based on a daily, weekly, monthly or yearly pattern. The exemplary active time period, defined in the time area 402, has been configured to occur daily and only on weekdays. Alternatively, an active time period may be configured to occur weekly on one or more specific days of the week (e.g., every Wednesday). Further alternatively, an active time period may be configured to occur weekly on one or more specific days in a month (e.g., the last Friday of every month). As will be clear to the person of ordinary skill, many patterns are available.

The scheduling window 400 further has a range area 406 in which the user may define an absolute date range for the active time period defined relatively in the time area 402 and the pattern area 404. For example, the user may wish the filter to only be active in the summer and may configure a date range of Jun. 21, 2006 until Sep. 21, 2006.

Once a user has successfully configured the active time for the e-mail filter using the scheduling window 400, the user actuates an "OK" button 410. Responsive to receipt of the event of the actuation of the "OK" button 410, the mobile device server 104 saves the recurrent scheduling information in a file associated with the e-mail account of the user of the mobile device 112. Alternatively, the user may actuate a "Cancel" button 412 and the recurrent scheduling information will not be saved.

Once a user has successfully configured an e-mail filter using the filter configuration interface window 300 of FIG. 3, the user actuates an "OK" button 310. Responsive to receipt of the event of the actuation of the "OK" button 310, the mobile device server 104 saves the e-mail filter conditions and actions in a file associated with the e-mail account of the user of the mobile device 112. Alternatively, the user may actuate a "Cancel" button 312 and a file will not be saved.

While the exemplary user interface windows 300, 400 in FIGS. 3 and 4 are shown as presented by the PC 120, it should be clear that user interface screens with the same, or similar, options may be presented by the mobile device 112.

In the case wherein user interface screens are presented by the mobile device 112, once the user has completed configuration of an e-mail filter, the mobile device 112 transmits an indication of the details of the e-mail filter, including recurrent scheduling information, to the mobile device server 104.

In operation, the mobile device server 104 receives (step 502, FIG. 5) an indication of the details of an e-mail filter. As discussed, the indication may be received from the PC 120 or from the mobile device 112. In an alternative embodiment, a user may configure the e-mail filter details using a user interface provided directly by the mobile device server 104, that is, without the use of a secondary device such as the PC 120 or the mobile device 112. The details of the e-mail filter are expected to include at least one filtering condition and recurrent scheduling information that defines a recurring "active" time period, i.e., a time period during which said given e-mail filter is to be active. Having received the details of the e-mail filter, the mobile device server 104 stores (step 504) the details in a file for later access.

Figure 5:
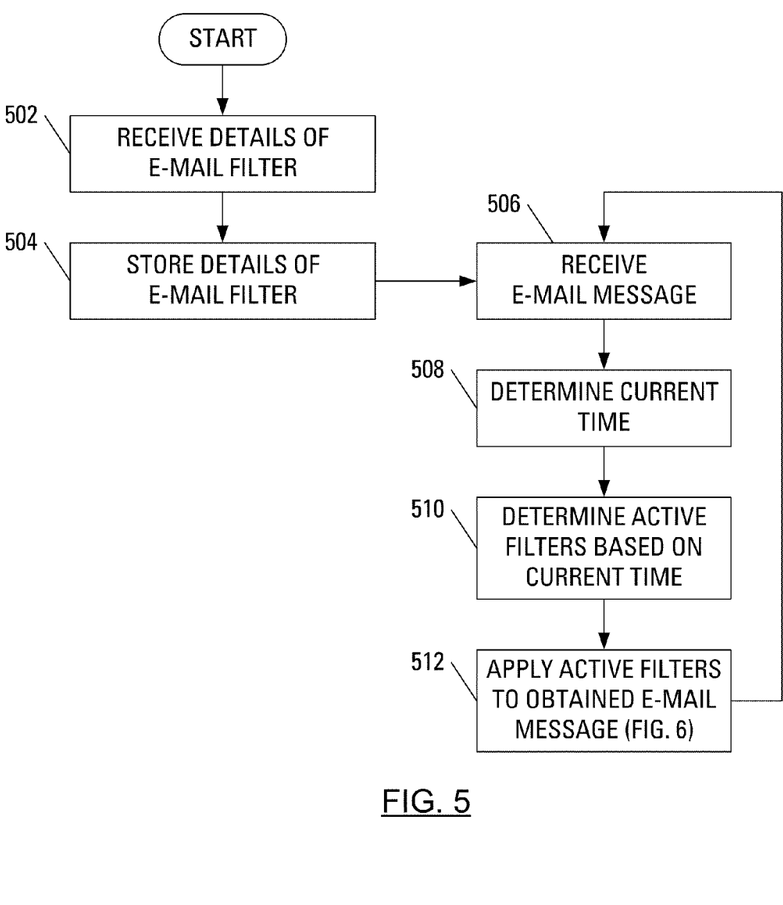
FIG. 5 illustrates steps in an exemplary method of handling schedulable e-mail filters.

The mobile device server 104 later, as is conventional in an exemplary system, polls the enterprise server 102 to determine whether new e-mail messages have been received for the e-mail account of the user of the mobile device 112. Upon learning that at least one new e-mail message has been received for the e-mail account of the user of the mobile device 112, the mobile device server 104 requests and receives (step 506) one new e-mail message among the at least one new e-mail messages from the enterprise server 102.

Responsive to having received (step 506) the new e-mail message and, due to the mobile device server 104 being adapted for handling schedulable e-mail filters, the mobile device server 104 determines (step 508) the current time.

The mobile device server 104 then determines (step 510) which of the configured e-mail filters are active. The determination of the active e-mail filters is based on the current time occurring during the active time period defined for each active e-mail filter. The mobile device server 104 then applies (step 512) the active e-mail filters to the obtained e-mail message.

Figure 6:
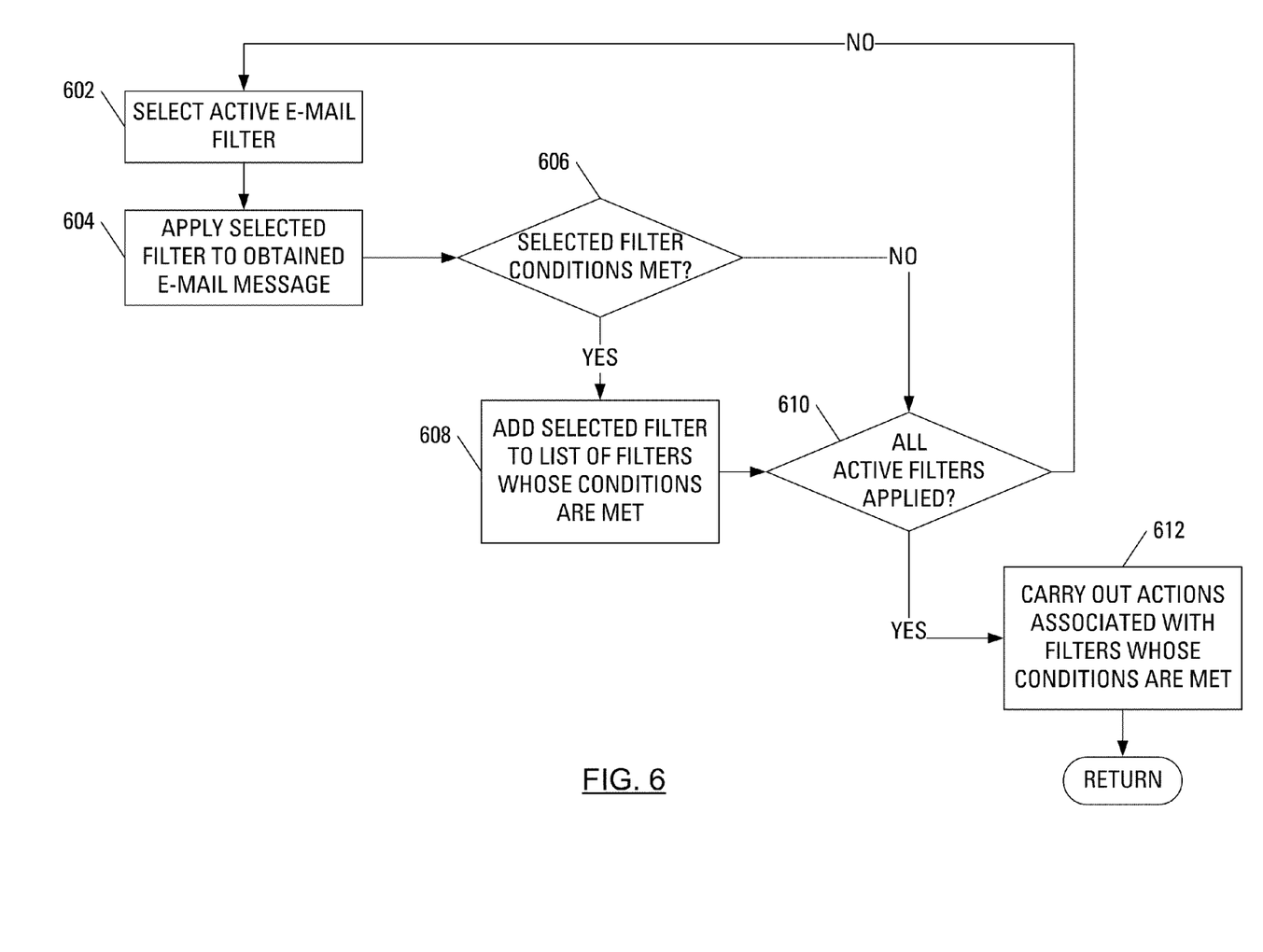
FIG. 6 illustrates steps in an exemplary method of applying the active e-mail filters to the obtained e-mail message according to an embodiment.

Steps in an exemplary method of applying (step 512) the active e-mail filters to the obtained e-mail message are illustrated in FIG. 6.

Initially, the mobile device server 104 selects (step 602) one of the active e-mail filters to be a candidate e-mail filter. The mobile device server 104 then applies (step 604) the candidate e-mail filter to the obtained e-mail message. That is, the mobile device server 104 compares the conditions specified in the candidate e-mail filter to the properties of the obtained e-mail message. The mobile device server 104 then determines (step 606) whether the properties of the obtained e-mail message meet the conditions specified in the candidate e-mail filter. If the mobile device server 104 determines that the conditions are met, the mobile device server 104 adds (step 608) the candidate e-mail filter to a list of active e-mail filters whose conditions have been met.

The mobile device server then determines (step 610) whether all e-mail filters that were determined, in step 510, to be active have been applied. If not all active e-mail filters have been applied, the mobile device server 104 selects (step 602) another active e-mail filter to be a candidate e-mail filter and applies (step 604) the candidate e-mail filter to the obtained e-mail message. If all active e-mail filters have been applied, the mobile device server 104 carries out the actions (step 616) specified in the e-mail filters whose conditions have been met.

In a first exemplary case, the user may configure an e-mail filter by specifying an action, a condition and an active time period. The action may be forwarding, to the mobile device 112, each received e-mail message that meets the condition. The condition may be the presence of a first particular e-mail address (say, the user's work e-mail address) in the "To:" field of the e-mail message. The active time period for this "work" e-mail filter may be defined as 9:00 AM to 5:00 PM on weekdays.

In a second exemplary case, the action may be forwarding, to the mobile device 112, each received e-mail message that meets the condition. The condition may be the presence of a second particular e-mail address (say, the user's personal e-mail address) in the "To:" field of the e-mail message. The active time period for this "personal" e-mail filter may be defined as 12:00 AM to 9:00 AM and 5:00 PM to 12:00 AM on weekdays and 12:00 AM to 12:00 AM on weekends.

Notably the active time period for the personal e-mail filter does not overlap the active time period for the work e-mail filter. As such, when the mobile device server 104 selects (step 602, FIG. 6) a candidate e-mail filter among the active e-mail filters, the mobile device server 104 is selecting among only one e-mail filter either the work e-mail filter or the personal e-mail filter.

It should be clear to a person of ordinary skill in the art that the application of active e-mail filters, as illustrated in FIG. 6, anticipates the possibility that the active time periods of at least two e-mail filters will overlap. Using the above exemplary cases, consider that the active time period for the personal e-mail filter is adjusted to extend from 4:00 PM to 12:00 AM on weekdays. Accordingly, on weekdays, between 4:00 PM and 5:00 PM both the work e-mail filter and the personal e-mail filter will be active. It follows that the mobile device server 104 will forward, to the mobile device 112, both e-mail messages that specify the user's work e-mail address in the "To:" field of the e-mail message and e-mail messages that specify the user's personal e-mail address in the "To:" field of the e-mail message.

It is further anticipated that e-mail filters with overlapping active time periods may be in conflict. That is, while the action for one e-mail filter may require the e-mail messages that meet the related condition be forwarded to the mobile device 112, the action for another e-mail filter may require suppression of the forwarding to the mobile device 112 of the e-mail messages that meet the related condition. For example, one e-mail filter may require the forwarding of all e-mail messages associated with an "urgent" priority while another e-mail filter may suppress forwarding of e-mail messages that include the word "mortgage" in the subject line. To handle such situations, the user may configure a priority for the e-mail filters so that, among e-mail filters whose conditions are met, i.e., those e-mail filters added to the list in step 608 of FIG. 6, the action associated with the e-mail filter with highest priority is carried out.

Thus far, the filtering of e-mail messages has been described as taking place at the mobile device server 104. As will be clear to a person of ordinary skill in the art, the filtering of e-mail messages may, alternatively, take place at the mobile device 112. The exemplary method illustrated in FIGS. 5 and 6 is equally applicable to the mobile device server 104, as described, and the mobile device 112. Indeed, the step 506 (FIG. 5), wherein the mobile device server 104 receives an e-mail message from the enterprise server 102, is realized as the mobile device 112 receives an e-mail message over the wireless network 170 from the mobile device server 104.

Additionally, consider the step 612 (FIG. 6), wherein the actions associated with the e-mail filters whose conditions have been determined (step 606) to have been met are carried out. As has been discussed, when the mobile device server 104 is performing the method, the action may relate to whether or not to forward the e-mail message to the mobile device 112. In contrast, when the mobile device 112 is performing the method, the action may relate to whether or not to list the e-mail message on the user interface presented on the display 226 on the mobile device 112, i.e., whether to show select information about the e-mail message in an "Inbox" list.

Notably, the filtering of e-mail messages at the mobile device 112 does not reduce network traffic to the mobile device 112, which traffic reduction is a benefit of filtering e-mail messages at the mobile device server 104. Nevertheless, it may be that a user would prefer that the mobile device 112 receive all e-mail messages obtained by the mobile device server 104, but display a filtered list of e-mail messages received at the mobile device 112.

While, thus far, the actions provided as examples have passively handled each e-mail message. It is further considered that where the conditions associated with a filter have been met, an "active" action may be defined, which relates to changing the e-mail message in some way. In the case wherein the mobile device server 104 is performing the filtering, the mobile device server 104 changes the e-mail message according to a defined active action before sending the e-mail message to the mobile device 112. Alternatively, in the case wherein the mobile device 112 is performing the filtering, the mobile device 112 changes the e-mail message according to a defined active action before making the e-mail message available to the used of the mobile device 112.

As an example, an active action may relate to amending an e-mail message to change a priority indication. Many mobile devices maintain "alert profiles" that allow a user to specify a manner in which the mobile device is to generate and alert based on qualities of a received message. For instance, the alert related to the receipt of a normal-priority message may be a vibration alert while the alert related to the receipt of a urgent-priority message may be an audio alert (e.g., a ring tone). Additionally, the priority of an e-mail message may also dictate the order in which a reference to the e-mail message is presented on a messaging screen of the mobile device 112. For instance, the mobile device 112 may be arranged to display references to urgent-priority e-mail messages higher in a list of references to received e-mail messages. Furthermore, the mobile device 112 may be arranged to display references to urgent-priority e-mail messages in a manner that differentiates references to urgent-priority e-mail messages from references to normal-priority e-mail messages. For example, urgent-priority e-mail messages may be differentiated with a different font, different color, bold font, italic font etc.

Advantageously, if an e-mail message meets the defined conditions and is received during a recurrent schedule, the mobile device 112 may perform an active action specifying that the priority indication of the e-mail message should be set to "Urgent" before sending the e-mail message to the mobile device 112. Accordingly, while the filter may not reduce the volume of network traffic arriving at the mobile device 112, the user of the mobile device 112 may be made particularly aware of the arrival of the e-mail message that meets the defined conditions.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of handling a message at a mobile communication device, said method comprising:
    receiving a message;
    determining a current time;
    selecting a candidate filter, said candidate filter defining a condition and an action to be carried out on messages that meet said condition, said candidate filter associated with a schedule defining a recurring active time period, said selecting based on said current time occurring within said recurring active time period, said action including amending said message to change a priority indication;
    determining that said message meets said condition; and
    responsive to determining that said message meets said condition, carrying out said action.

2. The method of claim 1 further comprising receiving filter configuration detail for said filter, said configuration detail including said action.

3. The method of claim 1 further comprising receiving filter configuration detail for said filter, said configuration detail including said condition.

4. The method of claim 1 further comprising receiving filter configuration detail for said filter, said configuration detail including said schedule.

5. The method of claim 1 further comprising determining which filters, among a plurality of filters, are active filters, where said determining which filters are active filters is based on said current time occurring within an active time period associated with each of said active filters.

6. The method of claim 5 wherein said candidate filter is selected, by said selecting, from among said active filters.

7. The method of claim 1 wherein said message comprises an e-mail message.

8. The method of claim 1 wherein said candidate filter is associated with a priority.

9. A mobile communication device comprising:
    a receiver adapted to receive a message;
    a display;
    an input device; and
    a processor adapted to:
       determine a current time;
       select a candidate filter, said candidate filter defining a condition and an action to be carried out on messages that meet said condition, said candidate filter associated with a schedule defining a recurring active time period, said selecting based on said current time occurring within said recurring active time period, said action including amending said message to change a priority indication;
       determine that said message meets said condition; and
       carry out said action.

10. The mobile communication device of claim 9 wherein said processor is further adapted to receive filter configuration detail for said filter, said configuration detail including said action.

11. The mobile communication device of claim 9 wherein said processor is further adapted to receive filter configuration detail for said filter, said configuration detail including said condition.

12. The mobile communication device of claim 9 wherein said processor is further adapted to receive filter configuration detail for said filter, said configuration detail including said schedule.

13. The mobile communication device of claim 9 wherein said processor is further adapted to determine which filters, among a plurality of filters, are active filters, where said determining which filters are active filters is based on said current time occurring within an active time period associated with each of said active filters.

14. The mobile communication device of claim 13 wherein said candidate filter is selected, by said selecting, from among said active filters.

15. The mobile communication device of claim 9 wherein said message comprises an e-mail message.

16. The mobile communication device of claim 9 wherein said candidate filter is associated with a priority.

17. A non-transitory computer readable medium containing computer-executable instructions that,
    when performed by a processor, cause said processor to:
       receive a message;
       determine a current time;
       select a candidate filter, said candidate filter defining a condition and an action to be carried out on messages that meet said condition, said candidate filter associated with a schedule defining a recurring active time period, said selecting based on said current time occurring within said recurring active time period, said action including amending said message to change a priority indication;
       determine that said message meets said condition; and
       carry out said action.

* * * * *